United States Patent [19]

Phelps et al.

[11] 4,078,184

[45] Mar. 7, 1978

[54] ELECTRIC CONDUIT ASSEMBLY FOR TRANSMITTING ELECTRIC POWER AT UHV AND EHV LEVELS

[75] Inventors: James D. M. Phelps, North Canton, Ohio; Alan J. McElroy, Bronx, N.Y.; Vincent Caleca, Fairlawn, N.J.

[73] Assignee: Interpace Corporation, Parsippany, N.J.

[21] Appl. No.: 620,822

[22] Filed: Oct. 8, 1975

[51] Int. Cl.$^2$ .................................... H01B 11/02
[52] U.S. Cl. ............................................. 307/147
[58] Field of Search ............ 307/147; 174/16 B, 22 C, 174/28, 99 B, 127, 143, 21 C, 105 R

[56] References Cited

U.S. PATENT DOCUMENTS

| | | | |
|---|---|---|---|
| 2,822,481 | 2/1958 | Schiller | 174/105 R |
| 2,903,654 | 9/1959 | Bartensen | 174/127 |
| 3,391,243 | 7/1968 | Whitehead | 174/28 |

FOREIGN PATENT DOCUMENTS

| | | | |
|---|---|---|---|
| 512,798 | 2/1955 | Italy | 174/127 |
| 31,425 | 7/1968 | Japan | 174/21 C |

*Primary Examiner*—David Smith, Jr.
*Attorney, Agent, or Firm*—Charles E. Baxley

[57] ABSTRACT

An electric conduit assembly using air as the insulative medium is capable of transmitting electric power at UHV and EHV levels. The conduit assembly comprises a conduit housing having a cylindrical conductor concentrically disposed therein with a cylindrical metal shield interposed between the conductor and conduit housing. The entire space within the conduit housing is filled with air under normal atmosphere conditions. A series of discrete lumped impedances, preferably lumped capacitances, are contained within the metal shield and electrically connect the shield to the conductor at spaced intervals along their lengths. The lumped impedances effectively reduce the electric field gradient thereby increasing the insulating withstand capability to such an extent that air under normal atmosphere conditions can be used as the insulative medium.

11 Claims, 9 Drawing Figures

ELECTRIC CONDUIT ASSEMBLY FOR TRANSMITTING ELECTRIC POWER AT UHV AND EHV LEVELS

The present invention pertains generally to transmission of electric power and more particularly to an electrical conduit assembly for isolated phase bus transmission of electric power.

BACKGROUND OF THE INVENTION

Electricity is usually generated at one location and then transmitted to other locations where the electricity is used. From its very beginning the electric utility industry has been almost universally dependent on overhead transmission lines for transmitting bulk electric power. Recently, however, an alternative approach of using underground transmission is gaining increasing popularity but still has limited use due to its much higher cost, inferior thermal capacity and long repair time as compared to the overhead transmission. Based on current expenses and on an equivalent capacity basis, conventional underground transmission systems are still 10 to 30 times more expensive than overhead transmission systems.

It is projected that for yet another decade, the cost of overhead transmission will increase as a linear function of the voltage level. Beyond this period, however, the economics of overhead transmission will become more burdensome. In fact, there is a growing body of experimental evidence that practical overhead transmission substantially beyond 2 million volts will not be practical because of exorbitant expense.

Cost of underground transmission does not increase as rapidly with increasing voltage because certain large fixed costs, such as acquiring right-of-way and trenching, are essentially independent of voltage level. With the advent of extra high voltage (EHV) overhead transmission, i.e. 230 kv to 800 kv the cost ratio of EHV underground to EHV overhead for the first time in history will be significantly less than an order of magnitude, ranging anywhere from 3 to 6. As the voltage level increases into the ultra-high voltage (UHV) range, the cost ratio becomes even more favorable for underground transmission.

The utility industry is also under pressure from environmental groups to consider alternatives to overhead transmission. Environmentalists are frequently successful in gaining local support to oppose construction of new lines and as a result, some state regulations make it more difficult for utility companies to obtain approval of proposed construction of new overhead EHV and UHV lines. It appears that the situation will probably become even more tenuous in the future. For example, a 1500 kv overhead transmission line would require a right-of-way of approximately 400 feet. In many areas of the country, such a right-of-way would be very difficult if not impossible to obtain.

In view of the foregoing, the utilities have expended much time and effort in devising underground transmission systems. For example, in 1966 the Edison Electric Institute embarked on a research and development program in underground transmission which program is still continuing. Areas of research include compressed-gas-insulated (CGI), cryoresistive, and superconducting underground cables. Some CGI cable installations of short length have recently been made, but the cost of these cables is too high to make them economically feasible. Cryoresistive and superconducting cables are still in development stages. The disadvantages of such cables are that they all require cooling stations, which reduces their reliability, and the installation and repair of the cables will be very time consuming and costly. Many technical problems must still be overcome, and it is doubtful that superconducting cables will be commercially available before 1990.

The CGI, cryoresistive and superconducting cables utilize special atmospheres which are sealed within the conduits to obtain their large power-carrying capability. The initial installation costs of these cables is high and these systems must be exceedingly reliable in operation because of the large expenses incurred and the long down time needed to make repairs. For example, before any section of a conduit can be repaired, the conduit must be evacuated to remove the noxious special atmosphere so that repairman can work on the conduit. Therefore increasing emphasis is being placed on devising an underground transmission system for UHV and EHV voltage levels and which uses air as the only atmosphere within the conduit.

The advantages of using air rather than other gases as the insulative medium are manyfold. The conduits are readily accessible for workmen to enter since they are always free of noxious gases. Therefore inspection and maintenance are simplified. The air itself is free and it is not essential to employ special cooling stations or compressing stations to maintain the system in operation. None of these advantages inure to the CGI, cryoresistive and superconducting cable systems.

The cost of underground air transmission with the same power-carrying capability as overhead transmission can be reduced because its rated voltage can be substantially lower than that needed for the overhead line. For example, the power capability of a transmission line is proportional to the square of its voltage rating and is inversely proportional to its positive sequence surge impedance. For an underground system, this ranges from 50 to 150 ohms. This is substantially less than the 250 ohm level for overhead lines, and the power capability of the underground line can therefore be increased according to the described relation. For the same power capability, the obvious alternative is to reduce the rated voltage of the underground line by the square root of the ratio of the surge impedances. For the ohmic values given, this comes out to be $\sqrt{100/250} = 0.63$ so that a 37 percent reduction in voltage is possible for the underground line, with consequent attendant reduction in costs.

This basic idea which utilizes the normal atmosphere, underground air insulation system has been contemplated for use at 230 kv. In this type system, all three phases are contained in the same conduit and the arrangement is referred to as non-segrated phase bus. This is a well-known idea described, for example, in U.S. Pat. No. 3,349,168. When projected to 765 kv, however, this scheme is impractical because the conduit diameter would approach 30 feet.

By using an alternative well-known scheme called isolated phase bus, it is possible to reduce the conduit diameter to 15 feet. In this arrangement, three conduits, each carrying one phase bus, are installed side-by-side and examples of isolated phase bus systems of this type are found in U.S. Pat. Nos. 2,892,012 and 3,197,551.

However, it has been found that even the smaller conduits of 15 foot diameter are still too large to be economically feasible. Thus whether the non-segrated phase bus or the isolated phase bus systems are used, the conduit size is a very significant factor with respect to both cost and power capabilities. The conduit size varies directly with cost and power capability and there are currently no air systems available, neither non-segrated phase bus nor isolated phase bus systems, which can handle 765 kv levels.

SUMMARY OF INVENTION

It is therefore a general object of the present invention to provide an underground transmission system which overcomes the major drawbacks of prior art systems and which is less expensive to install and maintain than present systems for the same voltage and power levels.

It is another object of the present invention to provide an underground transmission system for transmitting electric power by EHV and UHV levels and which uses air near normal atmospheric pressure as the insulative medium.

A still further object of the present invention is to provide an underground transmission system using air as the insulative medium and having means for controlling the electric field gradient to prevent breakdown of the air.

A still further object of the present invention is to provide an underground transmission system of the isolated phase bus type and which has means for reducing the electric field gradient to a sufficient degree so that air at normal, or slightly above normal atmospheric pressure can be used as the insulative medium at EHV and UHV levels.

A still further object of the present invention is to provide an underground transmission system for transmitting electric power and which has a conduit of as small a diameter as possible and which uses air as the insulative medium, yet is capable of transmitting power at EHV and UHV levels.

A still further object of the present invention is to provide an underground transmission system having a tubular shield interposed between the conductor and conduit housing and electrically interconnecting the conductor and shield by predetermined lumped impedances disposed at spaced intervals along their lengths so that the operating and transient voltages between conductor-to-shield and shield-to-housing are effectively divided in proportion to the insulation strengths between conductor-to-shield and shield-to-housing.

A still further object of the present invention is to provide a conduit assembly implantable in the ground and which is composed of an inner conductor, a metal shield and a conduit housing and having lumped impedance spaced at frequent intervals along the length of the assembly between the conductor and shield at intervals less than a quarter wavelength of the largest frequency component to be encountered in the system transients to thereby effectively reduce the electric field gradient.

A still further object of the present invention is to provide a conduit assembly for use in transmitting electric power at EHV and UHV levels and which has a reduced size as compared to prior art conduit assemblies and which uses air as the insulative medium.

The above and other objects of the invention are carried out by providing a conduit housing having a diameter on the order of 8 to 10 feet and having a cylindrical conductor concentrically disposed therein. A cylindrical metal shield is interposed between the conductor and conduit and is electrically connected to the conductor at spaced intervals along their lengths by discrete, lumped impedances which preferably comprise lumped capacitances. The presence of the additional lumped impedances effectively reduces the electric field gradient thereby causing a corresponding increase in the insulating withstand capability and, in fact, the insulating withstand capability is improved to such an extent that air under normal atmospheric pressure can be used as the insulative medium. No other insulative or dielectric materials are needed and such a system is suitable for transmitting power at 765 kv with an 8 GW capacity.

Having in mind the above as well as other objects, features and advantage of the invention that will be evident from an understanding of this disclosure, the present invention comprises the combinations and arrangement of parts as illustrated in the presently preferred embodiment which is hereinafter set forth in sufficient detail to enable those persons skilled in the art readily to understand the function, operation, construction and advantages of the invention when read in conjunction with the accompanying drawings.

DESCRIPTION OF PREFERRED EMBODIMENT

Figure 1:
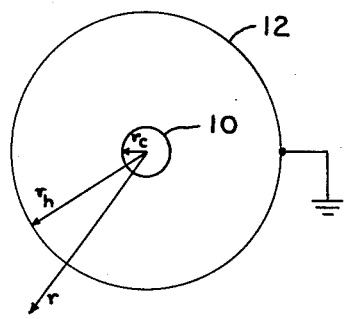
FIG. 1 is a cross-sectional view of a typical prior art coaxial transmission line.

Before discussing the details of the construction of the preferred embodiment, it will be helpful to summarize some of the basic principles upon which the invention is founded. A simple coaxial configuration is shown in FIG. 1 and comprises an inner conductor 10 having a radius $r_c$ contained within a conduit housing having a radius $r_h$. It is well known that the diameter of the conduit housing 12 must be made as small as possible in order to minimize the inductance and to maximize the capacitance of the transmission system. This is seen from the fact that the inductance L per unit length along the transmission line is $$L = \frac{\mu_o}{2\pi} \cdot \ln\left(\frac{r_h}{r_c}\right) \frac{\text{henrys}}{\text{meter}} \quad (1)$$

where

-continued $$\mu_o = 4\pi \times 10^{-7} \frac{\text{henrys}}{\text{meter}}$$

For the same coaxial transmission line, the capacitance C per unit lengths is $$C = \frac{2\pi\epsilon_o}{\ln\left(\frac{r_h}{r_c}\right)} \frac{\text{farads}}{\text{meter}} \quad (2)$$

where $$\epsilon_o \equiv 8.854 \times 10^{-12} \frac{\text{farads}}{\text{meter}}.$$

The surge impedance Z is therefore $$Z_o = \sqrt{L/C} \text{ ohms.} \quad (3)$$

Substituting equations (1) and (2) into equation (3) yields $$Z_o = \frac{1}{2\pi} \cdot \sqrt{\frac{\mu_o}{\epsilon_o}} \cdot \ln\left(\frac{r_h}{r_c}\right) \text{ohms.} \quad (4)$$

Figure 2:
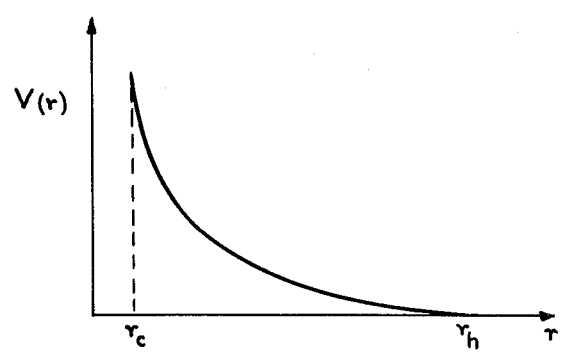
FIG. 2 is a plot of the electric potential distribution as a function of the radius for the coaxial transmission line shown in FIG. 1.

FIG. 2 is a graph showing the manner in which the electric potential distribution $V(r)$ varies as a function of the radial distance from the inner conductor to the grounded conduit housing 12. There is also an electric field between the high voltage conductor 10 and the grounded conduit housing 12 and this electric field has a particular manner or gradient in which it decreases from a high to a low voltage. More particularly and by mathematical definition, the electric field gradient is the first derivative of the potential distribution curve shown in FIG. 2 with respect to radial distance from the inner conductor 10. In other words, the slope of the potential distribution curve $V(r)$ defines the electric field gradient and the steeper the slope, the greater the gradient. From examining FIG. 2, it may be seen that the slope of the curve is steepest in the vicinity of the inner conductor 10 and consequently the portions of the insulative material which are closer to the conductor 10 must withstand progressively higher voltage gradients whereas the material further from the conductor 10 have to withstand progressively smaller voltage gradients. Each insulative material has its own withstand capability and will break down electrically if subjected to voltage gradients in excess of a prescribed level. Once a breakdown is initiated it tends to progress very rapidly until a semiconductive path is formed between the inner conductor and the outer conduit housing after which the transmission line is useless.

Figure 3:
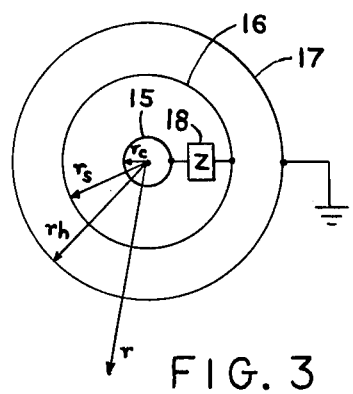
FIG. 3 is a cross-sectional view of a triaxial transmission line constructed in accordance with principles of the present invention.

In accordance with the invention, it has been found that by interposing a concentric metal shield between the inner conductor and the outer conduit housing, and by adding suitable impedance between the conductor and shield, the voltage gradient can be greatly reduced. FIG. 3 shows a triaxial arrangement composed of an inner conductor 15, a metal shield 16 and an outer conduit housing 17. The conduit housing is grounded in the same manner as the housing 12 in FIG. 1. An impedance device 18 is electrically connected between the inner conductor 15 and the shield 16 and a plurality of such impedance devices are disposed at regular, spaced intervals along the length of the triaxial transmission line. The nature of the impedance device 18 will be elaborated upon and described in more detail hereinafter.

Figure 4:
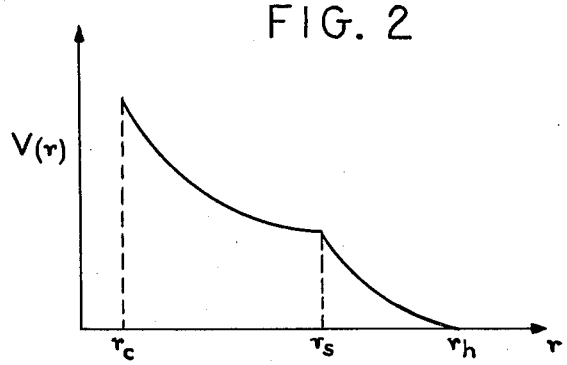
FIG. 4 is a plot of the electric potential distribution as a function of the radius for the triaxial transmission line shown in FIG. 3.

The electric potential distribution $V(r)$ for the triaxial line of FIG. 3 is shown in FIG. 4. From examining FIG. 4, it may be seen that the inclusion of the lumped impedance devices 18 has the effect of reducing the voltage gradient as compared to the coaxial line so that for a given size conduit, the reduced gradient means greater insulating withstand capability.

The electric potential distribution $V(r)$ of the triaxial line, as plotted in FIG. 4 for any radius $r$, is derived from the equation $$V(r) = r_s E(r = r_s) \cdot \ln\left(\frac{r}{r_c}\right) \text{volts} \quad (5)$$
$$\text{for } r_c \leq r \leq r_s$$

and $$V(r) = r_s E(r = r_s) \left[ \ln\left(\frac{r_s}{r_c}\right) + \frac{\epsilon}{\epsilon_o} \ln\left(\frac{r}{r_s}\right) \right] \text{volts.} \quad (6)$$
$$\text{for } r_s \leq r \leq r_h$$

where $$E(r = r_s) = \frac{V}{\epsilon r_s} \left[ \frac{1}{\epsilon} \cdot \ln\left(\frac{r_s}{r_c}\right) + \frac{1}{\epsilon_o} \cdot \ln\left(\frac{r_h}{r_s}\right) \right]^{-1} \frac{\text{volts}}{\text{meter}}.$$

The corresponding electric fields are obtained by differentiating the potential function with respect to radius such that $$E(r) = \frac{r_s}{r} \cdot E(r = r_s) \frac{\text{volts}}{\text{meter}} \quad (7)$$
$$\text{for } r_c \leq r \leq r_s$$

and $$E(r) = \left(\frac{\epsilon}{\epsilon_o}\right)\left(\frac{r_s}{r}\right) \cdot E(r = r_s) \frac{\text{volts}}{\text{meter}} \quad (8)$$
$$\text{for } r_s \leq r \leq r_h$$

For this triaxial configuration, the surge impedance is $$Z_o = \left\{ \frac{\mu_o}{(2\pi)^2} \cdot \ln\left(\frac{r_h}{r_c}\right) \left[ \frac{1}{\epsilon} \cdot \ln\left(\frac{r_s}{r_c}\right) + \frac{1}{\epsilon_o} \cdot \ln\left(\frac{r_h}{r_s}\right) \right] \right\}^{\frac{1}{2}} \text{ohms.} \quad (9)$$

which was obtained using equation (3) with the corresponding equation for inductance per unit length being identical to equation (1) and with the equation for capacitance per unit length as follows:

$$C = 2\pi \left[ \frac{1}{\epsilon} \cdot \ln\left(\frac{r_s}{r_c}\right) + \frac{1}{\epsilon_o} \cdot \ln\left(\frac{r_h}{r_s}\right) \right]^{-1} \frac{\text{farads}}{\text{meter}} \quad (10)$$

Equation (1) through (9) are all derived from basic electrostatic and magnetostatic principles which are well recognized and understood by those skilled in the art and therefore will not be further elaborated upon here. Suffice it to say, the remarkable improvement offered by the present invention over the prior art is easily seen by comparing FIGS. 2 and 4. The steepest slope of the potential distribution curve of FIG. 4 is considerably less than the steepest slope of the potential distribution curve of FIG. 2 and this means that for the same conduit size and for transmitting power at the same voltage level, the maximum voltage gradient occurring in the triaxial transmission line is considerably less than that occurring in the coaxial transmission line and therefore the insulating withstand capability of the insulative medium employed in the triaxial line is increased over that employed in the coaxial line. It must be noted that these advantages are not derived simply from using a triaxial system rather than a coaxial system but rather accrue due to the presence of the lumped impedances which will be explained more fully hereinafter.

The obvious advantages of forming the outer conduit housing as small as possible include cost savings for materials and supplies as well as labor savings due to quicker installation. In addition, the power stability limit of the transmission line is improved by forming the conduit as small as possible because the power stability limit is approximately inversely proportional to the total series inductance of the line. As is evident from equation (1), the inductance L is reduced by reducing the conduit housing radius $r_h$ thereby obtaining an increase in the power stability limit. A further advantage obtained by reducing the inductance in conjunction with increasing the capacitive is that the positive sequence surge impedance is reduced and this is readily discernible from equation (3). A reduction in the surge impedance results in a proportionate increase in the power transfer capability of the transmission line.

Figure 5:
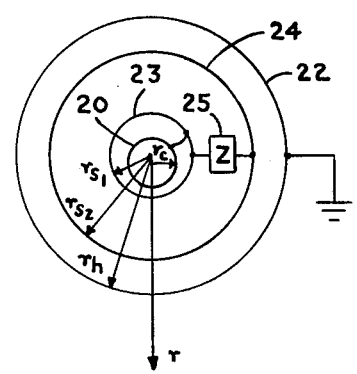
FIG. 5 is a cross-sectional view of a tetraxial transmission line contructed in accordance with the principles of the present invention.

The principles of the invention can be extended to and apply equally as well to transmission lines having a plurality of concentric metal shields. A tetraxial transmission line system is shown in FIG. 5 and comprises an inner conductor 20 contained within an outer conduit housing 22. Two metal cylindrical shields 23 and 24 are interposed between the conductor 20 and the conduit housing 22. In this arrangement, the inner metal shield 23 is electrically bonded to the conductor 20 and a series of lumped impedances 25 are connected between the two metal shields at spaced intervals along their lengths. The corresponding electric potential distribution V(r) for the tetraxial line is shown in FIG. 6.

Figure 6:
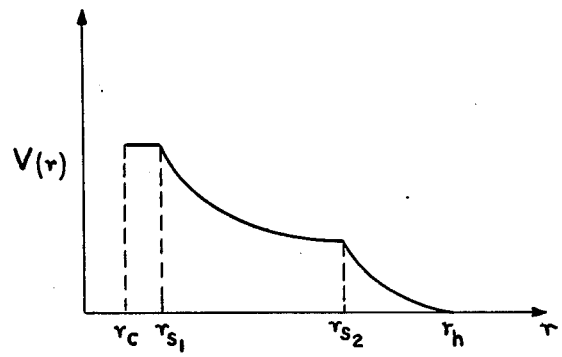
FIG. 6 is a plot of the electric potential distribution with respect to radius for the tetraxial transmission line shown in FIG. 5.

An advantage of the tetraxial arrangement is that the inner conductor 20 is housed within a faraday cage or faraday shield formed by the inner shield 23 which surrounds and completely shields the conductor 20 from external electric fields and is directly connected to the conductor so that both are maintained at the same electric potential as seen in FIG. 6. Due to this arrangement, the spatial position of the conductor 20 within the shield 23 is not at all critical and it is not necessary that the conductor 20 be concentrically disposed relative to the shields 23 and 24 and in fact, as shown in FIG. 5, the conductor can be eccentrically located within the shield 23. The conductor 20 may therefore be simply suspended within the shield 23 by any suitable means with the attendant advantage that the conductor itself may be flexible.

Another advantage of utilizing the faraday shield 23 is that the inner conductor 20 need not be smoothly finished and can therefore be formed of stranded cable or inexpensive tubing which normally has a rough surface texture. The inner and outer shields 23 and 24 must, of course, be rigid structures and precisely located within the conduit housing 22 in order to obtain optimum electric field gradient control.

Figure 7:
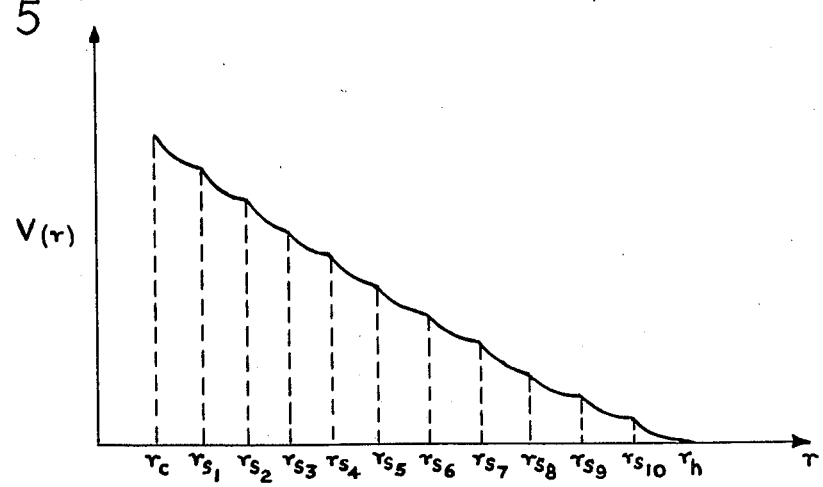
FIG. 7 is a plot of the electric potential distribution with respect to the radius of a theoretical transmission line employing ten concentric metal shields.

In accordance with a further aspect of the invention, additional metal shields may be interposed in concentric arrangement between the inner conductor and the outer conduit housing in order to further reduce the electric field gradient. Theoretically, enough shields can be utilized to the extent that the maximum gradient is reduced to the absolute minimum value dictated by the linear relation $V(r_c)/(r_c - r_h)$ where $V(r_c)$ is the rated line-to-ground voltage of the transmission line. This is shown in FIG. 7 which illustrates the electric potential distribution V(r), of a transmission system employing 10 concentric shields interposed between the inner conductor and outer conduit housing. However, each additional shield results in an increased cost and lower overall reliability of the transmission system due to the more complex structure. Therefore the triaxial or tetraxial arrangements are preferred in that they offer the best compromise of cost, reliability and electric field gradient control.

Figure 8:
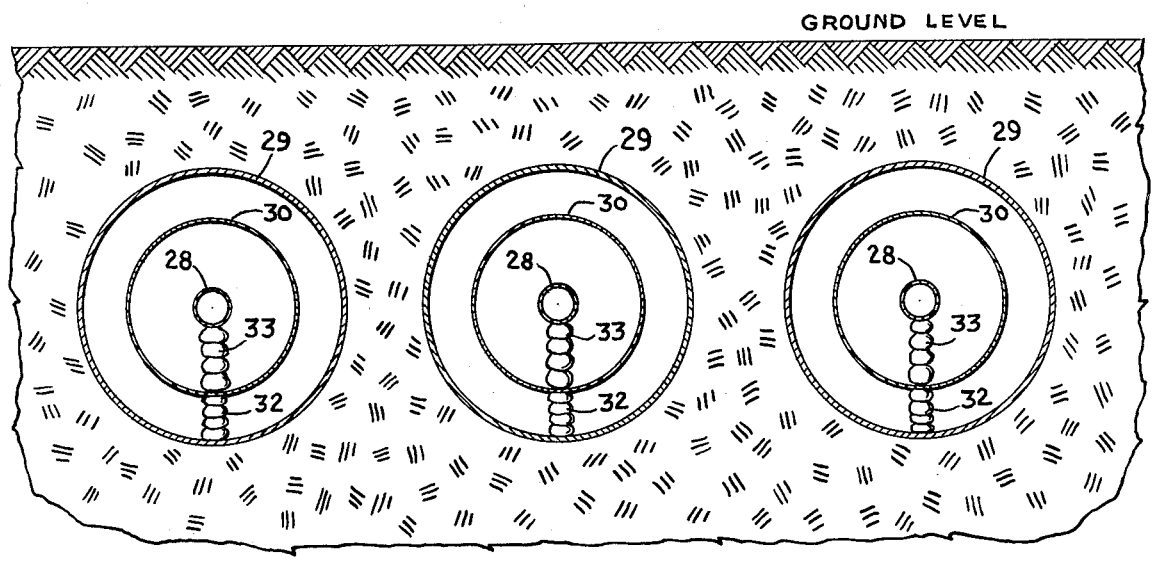
FIG. 8 is a cross-sectional view of an isolated phase bus system for transmitting power at EHV and UHV levels.
Figure 9:
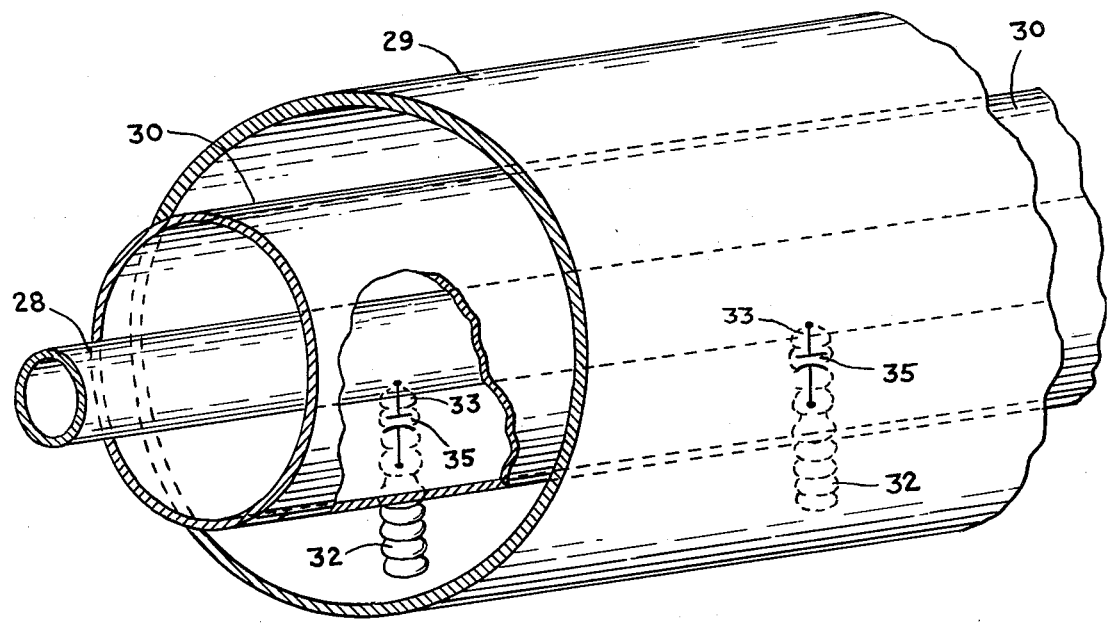
FIG. 9 is a perspective view of one of the three electrical conduit assemblies shown in FIG. 8.

An isolated phase bus system for transmitting electric power at EHV levels constructed in accordance with the principles of the invention is shown in FIG. 8. The system comprises three similar electrical conduit assemblies, each carrying one of the three phases of power. Since the three electrical conduit assemblies are all substantially identical, only one will be described in detail with reference to FIG. 9.

Each electrical conduit assembly comprises an inner cylindrical conductor 28 housed within a cylindrical conduit housing 29. A cylindrical metal shield 30 is interposed between the conductor 28 and the conduit housing 29 and all three cylindrical members are maintained in concentric and coaxial disposition. A series of supporting insulators 32 are disposed at axial intervals along the length of the conduit assembly and support the metal shield 30 within the conduit housing 29. Another set of supporting insulators 33 are disposed at axial spaced intervals within the metal shield 30 and support therein the inner conductor 28. The supporting insulators must, of course, be capable of withstanding the maximum electric field gradient which may be encountered during use of the electric conduit assembly during transmission of electric power at EHV and UHV levels and ample technology exists to enable construction of suitable insulators for this purpose. The entire space within the conduit housing 29 contains only air and this includes the space within the metal shield 30. The air comprises the insulating gas or insulative medium which insulates the inner conductor 28 from the metal shield 30 as well as from the outer conductor which consists of the conduit housing 29.

The axial distance between successive supporting units 32, 33 and 32, 33, etc. along the length of the conduit assembly is selected to be sufficiently small to ensure suitable radial voltage grading during peak transient conditions, such as caused by lightning or switching surges. In accordance with the invention, lumped impedances are provided at uniformly spaced intervals along the length of the metal shield 30 and interconnect the shield to the conductors 28. In the embodiment shown in FIG. 9, the lumped impedances 35 comprise capacitances which are built directly into the supporting insulators 33 and this construction seems to be the most economical because it combines the supporting insulator and lumped impedance into a single, unitary structure. It has been found that in order to obtain proper electric field control, the spacing between successive lumped impedances should be considerably less than a quarter wavelength of the largest frequency component in the system transients. Hence, if the lumped impedance is built directly into the supporting insulators 33, then the spacing distance between the insulators would be dictated by the highest transient frequency component.

In accordance with the invention, the lumped impedances may comprise either resistances or capacitances or a combination of the two. Lumped inductance cannot be used since this would drastically lower the surge impedance which, in turn, would reduce the power carrying capability of the transmission line. At normal operating frequency, 60 Hz, inductance is present between the conductor, shield and conduit housing but at this frequency, the distributed capacitance which is inherently present predominates. Therefore, any increase in the system inductance or any attenuation in the system capacitance is highly undesirable and causes a reduction in the surge impedance and therefore reduces the power carrying capabilities of the system.

It has been found from mathematical calculations and through experimentation that the lumped grading impedance should preferably be in the form of capacitance. Resistance grading is undesirable in that it is accompanied by high losses and capacitive grading has the added advantage that it reduces the surge impedance. A combination of both resistance and capacitive grading can be employed as the discrete, lumped impedance and this approach has the advantage that the small amount of additional resistance between the conductor and shield allows better electric field control in the vicinity of the supporting insulators and also in controlling transient surges.

In accordance with the principles of the present invention, it is theoretically possible to obtain the additional capacitance needed to reduce the electric field gradient by filling the space between conductor 28 and shield 30 with a dielectric fluid or solid instead of using uniformly spaced lumped impedances. However, for an electrical conduit assembly capable of transmitting power at EHV levels and having a conduit housing of about 8 feet in diameter, the mere cost of obtaining a suitable dielectric fluid or solid makes this approach entirely impractical. For example, calculations show that if the lumped impedances are removed and instead, the shield was filled with another dielectric medium, the dielectric medium would need a relative permittivity or dielectric constant of approximately 4.7. This means that materials such as organic liquids, polystyrene, cellulose, acetate, glass, oxides, melamine resin, and the like would have to be used and for a system having the dimensions necessary to transmit power at EHV levels, the cost of the dielectric would be prohibitive.

Comparative laboratory tests were run on coaxial and triaxial constructions of the type shown in FIGS. 1 and 3 and the results satisfactorily verify the theory advanced herein.

A coaxial construction utilizing a 6 inch I.D. × 20 inch extruded aluminum cylinder served as the housing and a range of inner conductors from 0.5 inch O.D. to 3.5 inch O.D. was used. The interior of the housing contained only air at normal atmospheric conditions.

The triaxial construction utilized the same housing as in the coaxial construction in conjunction with an inner conductor of 0.5 inch O.D. and a cylindrical shield of 2.25 inch diameter. Lumped capacitances of different values were interconnected between the inner conductor and the shield. The interior of the housing likewise contained only air at normal atmospheric conditions.

Voltage was applied in two modes for purposes of evaluating flashover characteristics and withstand capabilities. For the flashover tests, the voltage was increased as rapidly as possible to flashover, and for the withstand tests, the voltage was increased in steps and maintained for one minute or more at each level unless terminated by flashover.

Due to the limited length of the housing, localized higher stress in the vicinity of the housing ends was prevalent. This phenomenon, known as "end effect," adversely affects the flashover values and therefore to eliminate such "end effects," three different types of external field control devices were tried, namely toroidal rings, fine wire rings, and Rogowski surfaces.

Numerous tests were run and the results show that the use of the triaxial construction with lumped capacitance connected shield-to-conductor and using only air under normal conditions as the insulative medium effectively increased flashover by a factor of 1.5 to 2.0 over equivalent coaxial constructions. The test results thereby prove the principle of the invention of using lumped capacitance as a means to improve the flashover voltage of a triaxial system above the level obtainable in a coaxial system while using only air as the insulative medium.

Similar results were obtained in another series of tests using a coaxial construction with a 4 inch O.D. inner conductor disposed within a 48 inch I.D. housing and a triaxial construction having a 16 inch O.D. cylindrical shield interposed between the same inner conductor and housing as used in the coaxial tests. In the triaxial tests, lumped impedance in the form of lumped capacitance was connected between the inner conductor and the shield and the magnitude of lumped capacitance was varied in different test runs. In all the tests, the housing was grounded.

The flashover voltage of the coaxial construction was measured at 260 kv and in the triaxial construction, using a lumped capacitance of 448 pf, the flashover voltage was measured at 413 kv. This represents a 59% increase in the flashover voltage value over that obtained in the coaxial construction and hence an increase in flashover by a factor of 1.59 which is comparable to the results obtained in the previously described tests. These results indicate the remarkable increase in the value of flashover voltage obtainable by practicing the invention as compared to the standard coaxial constructions.

As a practical matter, the 4 - 16 - 48 inches triaxial construction could be used for transmitting electric power at 345 kv on a commercial scale. For example, a nominal 345 kv system would require that switching surges not exceed 1.75 times the peak value of the nominal system voltage relative to ground, i.e., a switching surge factor of 1.75, and that the maximum system voltage not exceed 1.05 times the nominal system voltage, i.e., an overvoltage factor of 1.05. Based on these factors, the required flashover voltage would be 458 kv which is only 10% greater than the measured flashover voltage of the triaxial test construction. It is significant to note that the triaxial test construction was not by any means an optimized system yet its performance indicates that it is capable of transmitting electric power in the EHV range and hence is suitable for 345 kv systems.

Based on the performance of the 4 - 16 - 48 inches triaxial construction, the projected performance of a 10 - 32 - 120 inches triaxial construction has been made. In this case, the flashover voltage comparable to 413 kv in the smaller system is 843 kv in the larger system which is only 3% less than the requirement for a 765 kv system with a switching surge factor of 1.5 and an overvoltage factor of 1.05. It can therefore be expected that electric conduit assemblies can be constructed adopting the principles of the invention for transmitting electric power at the conventional 765 kv and higher voltage levels.

We claim:

1. An electric conduit assembly for transmitting therealong bulk electric power at high voltage levels on the order of 300 kv and higher using only air as the insulative medium comprising: a conduit connectable to ground potential during use of the conduit assembly; an elongated electric conductor disposed within said conduit extending lengthwise thereof and connectable to a source of high potential during use of the conduit assembly so as to establish an intense electric field between said conductor and conduit; and electric field gradient reducing means comprising a tubular metal shield interposed between and spaced from said conductor and conduit and electrically floating, and means defining lumped impedances coupling together said shield and conductor at spaced intervals along their lengths to effect reduction in the electric field gradient between said conductor and conduit and raising of the conductor-to-conduit flashover voltage as compared to an otherwise similar conduit assembly without said tubular metal shield and lumped impedances, said means defining lumped impedances being wholly within the region between said shield and said conductor.

2. An electric conduit assembly according to claim 1; wherein said lumped impedances comprise lumped capacitances havng predetermined capacitance values effective to reduce the electric field gradient.

3. An electric conduit assembly for transmitting therealong bulk electric power at EHV levels using only air as the insulative medium comprising: a conduit connectable to ground potential during use of the conduit assembly; an elongated electric conductor disposed within said conduit extending lengthwise thereof and connectable to an EHV potential source during use of the conduit assembly so as to establish an intense electric field between said conductor and conduit; and electric field gradient reducing means comprising a first tubular metal shield interposed between and spaced from said conductor and conduit and electrically floating, and means defining lumped impedances coupling together said shield and conductor at spaced intervals along their lengths to effect reduction in the electric field gradient between said conductor and conduit to an extent sufficient to enable air under substantially atmospheric conditions to be used as the only insulative medium within said circuit, means defining lumped impedances being wholly within the region between said shield and said conductor.

4. An electric conduit assembly according to claim 3; further comprising a plurality of further tubular metal shields interposed between said conduit and said first tubular metal shield and arranged one inside the other in spaced relationship, means electrically connecting each outer shield to its immediately adjacent inner shield including means defining lumped impedances coupling together the innermost of said further shields to said first shield at spaced intervals along their lengths to effect reduction in the electric field gradient between said conductor and conduit to an extent sufficient to enable air under normal atmospheric conditions to be used as the only insulative medium within said conduit.

5. An electric conduit assembly according to claim 3 further comprising a second tubular metal shield interposed between said conduit and said first shield in spaced relationship, means electrically connecting said second shield to said first shield including means electrically connecting said first shield directly to said conductor to define thereabout a faraday shield, and means defining lumped impedances coupling together said first and second shields at spaced intervals along their lengths to effect reduction in the electric field gradient between said conductor and conduit to an extent sufficient to enable air under normal atmospheric conditions to be used as the only insulative medium within said conduit.

6. An electric conduit assembly according to claim 3; wherein said lumped impedances comprise lumped capacitances having predetermined capacitance values effective to reduce the electric field gradient.

7. An isolated phase bus system for transmitting bulk electric power of EHV levels from an EHV potential source comprising: at least one electric conduit assembly comprising a conduit electrically connected to ground potential, an elongated electric conductor disposed within said conduit extending lengthwise thereof and electrically connected during use of the bus system to an EHV potential source thereby establishing an electric field between said conductor and conduit, an insulative medium consisting of only air at substantially atmospheric conditions within said conduit, and a first tubular metal shield surrounding said conductor and electrically floating and lumped impedances intercoupling said conductor and shield at regularly spaced intervals along their lengths thereby increasing the withstand capability of the air to such an extent that the same may be used at substantially atmospheric conditions during transmission of bulk electric power of EHV levels.

8. An electric conduit assembly according to claim 7; further comprising a plurality of further tubular metal shields interposed between said conduit and said first tubular metal shield and arranged one inside the other in spaced relationship, means electrically connected each outer shield to its immediately adjacent inner shield including means defining lumped impedances coupling together the innermost of said further shields to said first shield at spaced intervals along their lengths to effect reduction in the electric field gradient between said conductor and conduit to an extent sufficient to enable air under normal atmospheric conditions to be used as the only insulative medium within said conduit.

9. An electric conduit assembly according to claim 7 further comprising a second tubular metal shield interposed between said conduit and said first shield in spaced relationship, means electrically connecting said second shield to said first shield including means electrically connecting said first shield directly to said conductor to define thereabout a faraday shield, and means defining lumped impedances coupling together said first and second shields at regularly spaced intervals along their lengths to effect reduction in the electric field gradient between said conductor and conduit to an extent sufficient to enable air under normal atmospheric conditions to be used as the only insulative medium within said conduit.

10. An isolated phase bus system according to claim 7; comprising three electric conduit assemblies each having the construction defined in claim 7 and each operable to transmit one phase of three phases of electric power.

11. An isolated phase bus system according to claim 7; wherein said lumped impedances comprise lumped capacitances having predetermined capcitance values effective to reduce the electric field gradient.

* * * * *

UNITED STATES PATENT OFFICE
CERTIFICATE OF CORRECTION

Patent No. 4,078,184　　　　　　　　　　Dated　March 7, 1978

Inventor(s)　James D.M. Phelps et al

It is certified that error appears in the above-identified patent and that said Letters Patent are hereby corrected as shown below:

Column 11, line 27 "havng" should read -- having --.

Column 12, line 36, "connected" should read -- connecting --.

Signed and Sealed this

Fourteenth Day of November 1978

[SEAL]

Attest:

RUTH C. MASON
*Attesting Officer*

DONALD W. BANNER
*Commissioner of Patents and Trademarks*